US012789928B2

(12) United States Patent
Claesson et al.

(10) Patent No.: US 12,789,928 B2
(45) Date of Patent: Nov. 10, 2026

(54) METHOD FOR ELECTRICALLY CONNECTING TWO MODULES OF A VEHICLE, A CONTROL DEVICE, A VEHICLE, A SYSTEM, A COMPUTER PROGRAM AND A COMPUTER-READABLE MEDIUM

(71) Applicant: Scania CV AB, Södertälje (SE)

(72) Inventors: André Claesson, Tullinge (SE); Robert Sjödin, Nyköping (SE); Linus Ährlig, Västerhaninge (SE); Sami Teppola, Nykvarn (SE); Mikko Kallio, Hölö (SE); Tomas Skeppström, Södertälje (SE); Morgan Colling, Hölö (SE)

(73) Assignee: Scania CV AB, Södertälje (SE)

( * ) Notice: Subject to any disclaimer, the term of this patent is extended or adjusted under 35 U.S.C. 154(b) by 957 days.

(21) Appl. No.: 17/041,582

(22) PCT Filed: Mar. 22, 2019

(86) PCT No.: PCT/SE2019/050255
§ 371 (c)(1),
(2) Date: Sep. 25, 2020

(87) PCT Pub. No.: WO2019/194720
PCT Pub. Date: Oct. 10, 2019

(65) Prior Publication Data
US 2021/0053633 A1 Feb. 25, 2021

(30) Foreign Application Priority Data
Apr. 6, 2018 (SE) .................................... 1850387-0

(51) Int. Cl.
*B62D 63/02* (2006.01)
*B60P 3/42* (2006.01)
(Continued)

(52) U.S. Cl.
CPC .............. *B62D 63/025* (2013.01); *B60P 3/42* (2013.01); *B60P 3/423* (2013.01); *B60R 16/023* (2013.01); *G07C 5/008* (2013.01); *G07C 5/08* (2013.01)

(58) Field of Classification Search
CPC ..................................................... B62D 63/025
See application file for complete search history.

(56) References Cited

U.S. PATENT DOCUMENTS 5,726,541 A 3/1998 Glenn et al. .................... 318/16
6,059,058 A 5/2000 Dower ......................... 180/65.3
(Continued)

FOREIGN PATENT DOCUMENTS

DE 10 2011 056 561 A1 6/2013
DE 10 2016 209 099 A1 7/2017
(Continued)

OTHER PUBLICATIONS

Google Machine Translation of EP3326703B1 (Mar. 14, 2014) (Year: 2014).*
(Continued)

*Primary Examiner* — Jean Paul Cass
(74) *Attorney, Agent, or Firm* — Banner & Witcoff, Ltd.

(57) ABSTRACT

A method, performed by a control device (100) of a first module (30, 40) of a vehicle (1), for electrically connecting the first module (30, 40) with a second module (30, 40) physically connected with the first module (30, 40), wherein the assembled vehicle (1) is configured to communicate with a control centre (200). The method includes the steps of: activating (s101) a communication device (50) in the first module (30, 40); transmitting (s102) information about the first module (30, 40) to the second module (30, 40), and receiving (s103) information about the second module (30, 40), via the communication device (50) for establishing an
(Continued)

electrical connection; and transmitting (s104) a verification of the electrical connection towards the control centre (200).

19 Claims, 4 Drawing Sheets

(51) Int. Cl.
*B60R 16/023* (2006.01)
*G07C 5/00* (2006.01)
*G07C 5/08* (2006.01)

(56) References Cited

U.S. PATENT DOCUMENTS

| | | | | |
|---|---|---|---|---|
| 9,004,205 | B2 | 4/2015 | Oberg | |
| 9,802,661 | B1 | 10/2017 | Kentley-Klay | |
| 11,505,283 | B1 * | 11/2022 | Seeley | B63B 3/08 |
| 11,505,296 | B1 * | 11/2022 | Seeley | B63B 13/00 |
| 11,511,836 | B1 * | 11/2022 | Seeley | B63G 8/001 |
| 11,530,017 | B1 * | 12/2022 | Seeley | B63G 8/22 |
| 11,530,019 | B1 * | 12/2022 | Seeley | B63G 8/001 |
| 11,541,801 | B1 * | 1/2023 | Seeley | B60P 3/00 |
| 11,603,170 | B1 * | 3/2023 | Guild | B63B 21/02 |
| 11,608,149 | B1 * | 3/2023 | Seeley | B63B 3/08 |
| 11,745,840 | B1 * | 9/2023 | Seeley | B63G 8/001<br>439/866 |
| 11,745,841 | B2 * | 9/2023 | Seeley | B33Y 80/00<br>416/1 |
| 2010/0256852 | A1 * | 10/2010 | Mudalige | G08G 1/163<br>701/24 |
| 2014/0262583 | A1 * | 9/2014 | Url | B62D 33/023<br>296/183.1 |
| 2015/0217819 | A1 | 8/2015 | Pojidaev | |
| 2015/0347959 | A1 * | 12/2015 | Skaaksrud | H04W 52/40<br>705/333 |
| 2016/0129958 | A1 | 5/2016 | Byrnes et al. | |
| 2016/0152288 | A1 | 6/2016 | Riedel et al. | |
| 2017/0197679 | A1 | 7/2017 | Scaringe et al. | |
| 2017/0203801 | A1 | 7/2017 | Hung et al. | |
| 2018/0022405 | A1 | 1/2018 | Gecchelin et al. | |
| 2018/0050626 | A1 | 2/2018 | Delp | |
| 2019/0056736 | A1 * | 2/2019 | Wood | G05D 1/0246 |
| 2021/0179242 | A1 * | 6/2021 | Seeley | B63G 8/001 |
| 2022/0390960 | A1 * | 12/2022 | Seeley | B33Y 80/00 |
| 2023/0058169 | A1 * | 2/2023 | Cella | G06F 11/3013 |

FOREIGN PATENT DOCUMENTS

| | | | | | |
|---|---|---|---|---|---|
| EP | 3003772 | A1 | | 4/2016 | |
| EP | 3326703 | B1 | * | 11/2020 | A63F 13/00 |
| GB | 2570898 | | * | 8/2018 | |
| JP | 2014-522467 | A | | 9/2014 | |
| WO | WO-2005095192 | A1 | * | 10/2005 | B62D 27/06 |
| WO | WO 2014/039041 | A1 | | 3/2014 | |
| WO | WO 2014/194409 | A1 | | 12/2014 | |

OTHER PUBLICATIONS

European Search Report, dated Oct. 11, 2021, issued in corresponding European Patent Application No. 19 780 559.1. Total 8 pages.
Korean Office Action, dated Oct. 28, 2021, issued in corresponding Korean Patent Application No. 10-2020-7026759. Includes English translation. Total 15 pages.
Novelty Search Report dated Jan. 31, 2018.
Office Action mailed Oct. 19, 2018 in corresponding Swedish Patent Application No. 1850387-0.
International Search Report mailed Apr. 11, 2019 in corresponding PCT International Application No. PCT/SE2019/050255.
Written Opinion mailed Apr. 11, 2019 in corresponding PCT International Application No. PCT/SE2019/050255.
M. Jahn et al., Concept of Actuation and Control for the EO Smart Connecting Car (EO scc), Intelligent Robotics and Applications, 5th International Conference on Intelligent Robotics and Applications, Part I, pp. 87-98, Montreal, QC, Canada, Oct. 3-3, 2012.
Oct. 26, 2023—(BR) Office Action—App. No. BR112020018847.6.
Apr. 1, 2025—(BR) Office Action—BR112020018847.6.
Dec. 10, 2024—(BR) Second Office Action—App. No. BR112020018847-6.

* cited by examiner

METHOD FOR ELECTRICALLY CONNECTING TWO MODULES OF A VEHICLE, A CONTROL DEVICE, A VEHICLE, A SYSTEM, A COMPUTER PROGRAM AND A COMPUTER-READABLE MEDIUM

CROSS-REFERENCE TO RELATED APPLICATIONS

The present application is a 35 U.S.C. §§ 371 national phase conversion of PCT/SE2019/050255, filed Mar. 22, 2019, the contents of which are incorporated herein by reference, which claims priority of Swedish Patent Application No. 1850387-0 filed Apr. 6, 2018, the contents of which are incorporated by reference herein. The PCT International Application was published in the English language.

TECHNICAL FIELD

The present invention relates to a method for electrically connecting two physically connected modules of a vehicle. The present invention also relates to a control device, a vehicle, a system for electrically connecting two physically connected modules of a vehicle, a computer program and a computer-readable medium.

BACKGROUND

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. A more flexible vehicle which enables customization may therefore be desired.

There are, for example, known solutions where a truck can be rebuilt by changing a concrete mixer to a loading platform. This increases the flexibility and two different functions can be achieved by means of one single vehicle. Depending on the modules, it may be desired to enable communication between the modules. The modules may thereby have to be electrically connected when being part of a vehicle. This electrical connection can be established in various ways and may be a cumbersome process. Document US-2016/0129958 A discloses a modular electric vehicle using interchangeable vehicle assembly modules. The user can thereby disassemble and reassemble the vehicle for use in different applications. The modules are all connected to a central bus and a central network bus.

SUMMARY

Despite known solutions in the field, it would be desirable to achieve a way of electrically connecting physically connected modules of a vehicle, which solves or at least alleviates at least some of the drawbacks of the prior art.

An object of the present invention is therefore to achieve a new and advantageous method for electrically connecting two physically connected modules of a vehicle, which method is safer, easier and less time consuming than prior art solutions. Another object of the invention is to achieve a new and advantageous control device, vehicle, system, computer program and computer-readable medium for electrically connecting two physically connected modules of a vehicle in a safer, easier and less time consuming way.

The herein mentioned objects are achieved by a method for electrically connecting modules of a vehicle, a control device, a vehicle, a system, a computer program and a computer-readable medium as disclosed herein.

Hence, according to an aspect of the present invention a method, performed by a control device of a first module of a vehicle, is provided, for electrically connecting the first module with a second module physically connected with the first module. The vehicle is assembled from a set of modules comprising: at least one drive module; and at least one functional module, wherein the at least one drive module comprises a pair of wheels and is configured to be autonomously operated and drive the assembled vehicle, wherein the assembled vehicle is configured to communicate with a control centre. The method comprises: activating communication means in the first module; transmitting information about the first module to the second module and receiving information about the second module via the communication means for establishing an electrical connection; and transmitting a verification of the electrical connection, towards the control centre.

According to another aspect of the invention a control device of a first module of a vehicle is provided, the control device being configured for electrically connecting the first module with a second module physically connected with the first module, the vehicle being assembled from a set of modules comprising: at least one drive module; and at least one functional module, wherein the at least one drive module comprises a pair of wheels and is configured to be autonomously operated and drive the assembled vehicle, and wherein the assembled vehicle is configured to communicate with a control centre. The control device is configured to: activate communication means in the first module; transmit information about the first module to the second module, and receive information about the second module, via the communication means, for establishing an electrical connection; and transmit a verification of the electrical connection towards the control centre.

According to yet another aspect of the invention a vehicle assembled from a set of modules is provided. The vehicle comprises at least one drive module and at least one functional module, wherein the at least one drive module comprises a pair of wheels and is configured to be autonomously operated and drive the assembled vehicle. The vehicle further comprises two control devices as disclosed herein.

According to an aspect of the invention a system, configured to electrically connect two physically connected modules of a vehicle assembled from a set of modules is provided. The system comprises: a control centre arranged in communication with the assembled vehicle. The system further comprises two control devices as disclosed herein.

Assembling a vehicle from a set of modules makes it possible to dynamically assemble a vehicle depending on a current mission or function to be performed. This way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. By using at least one autonomously operated drive module, the drive module may autonomously/automatically perform the physical connection and the electrical connection with a second module. This way, no manual work is required and the assembly of the vehicle is less cumbersome and much more time efficient. By means of the disclosed method, the electrical connection between two physically connected modules can be performed in an efficient way. The electrical connection is established by means of exchanging information about the respective modules via activated communication means in each module. The electrical connection is subsequently verified to the control centre. By the verification of the electrical connection, the control centre will be informed about which modules are being electrically connected. The control centre may be configured to initiate assembly of the vehicle and may thereby be configured to determine which modules to use in order to perform a certain mission/function. By the verification of the electrical connection, the control centre may thus detect if incorrect modules are electrically connected before the assembled vehicle is used. Also, by means of the verification, the control centre will know that the electrical connection has been established correctly. Thus, by means of the verification, it is ensured that correct modules are connected and that they are electrically connected in a correct way. Safety is thereby increased. The verification may also trigger the control centre to give the assembled vehicle a command to perform a certain mission/function.

Further objects, advantages and novel features of the present invention will become apparent to one skilled in the art from the following details, and also by putting the invention into practice. Whereas embodiments of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
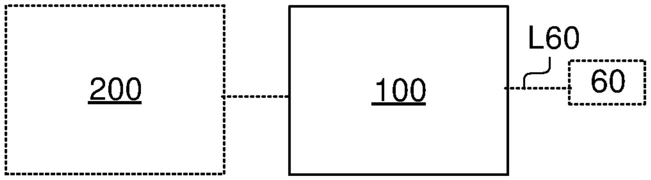
FIG. 1 schematically illustrates a control device for electrically connecting two modules of a vehicle according to an embodiment.

When assembling a vehicle from a set of modules, it may be desired to electrically connect the modules. To be able to ensure safety, a method for electrically connecting two physically connected modules of a vehicle has been developed. A modularized vehicle according to the present disclosure is typically assembled, and the modules are electrically connected, at the vehicle owner's premises and the vehicle owner may thus buy a set of modules from a manufacturer. The present disclosure is applicable on all sorts of road vehicles. However, this disclosure may relate to heavy vehicles, such as buses, trucks etc. Specifically, the present disclosure may relate to vehicles for use on public roads.

According to an aspect of the present disclosure, a method, performed by a control device of a first module of a vehicle, for electrically connecting the first module with a second module physically connected with the first module, is provided. The vehicle is assembled from a set of modules comprising at least one drive module; and at least one functional module, wherein the at least one drive module comprises a pair of wheels and is configured to be autonomously operated and drive the assembled vehicle, wherein the assembled vehicle is configured to communicate with a control centre. The method comprises: activating communication means in the first module; transmitting information about the first module to the second module, and receiving information about the second module, via the communication means for establishing an electrical connection; and transmitting a verification of the electrical connection towards the control centre. The control device of the first module is thus configured to communicate with the control centre either directly or indirectly via the second module. By activating communication means in the first module, communication with other modules is enabled. By transmitting information about the first module to the second module and receiving information about the second module, the two physically connected modules will exchange information which may be necessary for the operation of the assembled vehicle. Transmitting information about the first module to the second module may be referred to as sending information. Also, via the exchange of information, the electrical connection is established and the first module may be able to determine if the second module is a correct module to be electrically connected with. The verification informs the control centre that correct modules are electrically connected in a correct way and that the vehicle thereby is ready to receive instructions regarding a function/mission to perform.

The set of modules from which the vehicle is assembled may comprise a plurality of drive modules and a plurality of functional modules. The first module may thus be a drive module or a functional module and the second module may be a drive module or a functional module. The different drive modules of the set of modules may be identical or the drive modules may for example have different types/sizes of wheels, different suspension and/or different charge capacity. In one example each drive module comprises a body provided with a pair of wheels arranged on two opposite sides of the drive module. In an example, the drive module comprises only one pair of wheels. The drive module comprises at least one propulsion unit connected to the pair of wheels. The propulsion unit may be an electric machine, connected to the wheels. The pair of wheels of the drive module may thus be referred to as drive wheels. In one example, the drive module comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. In this way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example the drive module further comprises at least one energy storage unit for providing the propulsion unit with energy. The energy storage unit may be an electric battery. The electric battery may be rechargeable. The drive module being configured to be autonomously operated means that the drive module comprises a plurality of sensors and systems for steering and driving the drive module automatically as an independent unit according to conventional methods. According to an example, the drive module comprises a navigation system and sensors for detecting objects in the surrounding of the drive module. The drive module may be referred to as an autonomously operated vehicle in the sense that it is allowed to operate on public roads.

Each functional module is configured to perform a predetermined function while being part of an assembled vehicle. In one example, the functional module is configured to accommodate or support a load. The functional module may be configured for accommodating passengers and may thus form a bus when being assembled with at least one drive module. The functional module may alternatively be configured for transporting goods and may thus form a truck when being assembled with at least one drive module. The functional module may be any of a garbage truck body, a loading platform, a fork arrangement for a forklift, and a snowplough just to mention some non-limiting examples. The functional module may comprise trailing wheels which are not driven or steerable. A functional module cannot move on its own but needs to be connected to at least one drive module to be able to move and thereby function as a vehicle. The functional module may comprise an energy storage unit, such as a battery.

According to one example, the first module and the second module both comprises a control device as disclosed herein, wherein the method is performed in both modules. Thus, the control device of the first module and the control device of the second module will be able to communicate when communication means in both modules are activated. The control device of the first module is thus configured to communicate with a control device of the second module.

The first module and the second module may be physically connected through corresponding physical interfaces. Such physical interfaces may be configured in different ways, and may for example comprise coupling units adapted to engage, quick couplings, hooks, cooperating protrusions and recesses or similar. It is to be understood that the configuration of the physical interface is not part of the invention per se. The first module may comprise a physical interface for connection with another module on at least two different sides of the first module. This way, the first module can be connected to another module in various ways and the flexibility is increased. In the event that the first module is a drive module, the first module may comprise a physical interface both on a front side of the first module and on a rear side of the first module, with regard to a travelling direction of the first module. The first module can thereby be connected to a front section of a functional module and to a rear section of a functional module, with regard to a travelling direction of the first module, without having to turn the first module. Additionally or alternatively, the first module may comprise a physical interface on a top side of the first module. The different physical interfaces for connection with another module may be identical on all sides of the first module. By using a standard interface which can be used for connection with another drive module as well as a functional module, the flexibility of the first module increases and the assembly of a vehicle are facilitated. The physical connection may be autonomously performed when the first module and/or the second module is an autonomously operated drive module.

According to one example, the verification is transmitted from the first module directly to the control centre. Thus, both the first module and the second module may transmit verifications directly to the control centre. In this case, the control centre will receive verifications from all/both electrically connected modules. Alternatively, the verification may be transmitted towards the control centre via the second module electrically connected with the first module. This way, the second module may receive a verification from the first module and may either forward the verification to the control centre together with a verification from the second module, or the second module may transmit a single verification including both a verification from the first module and its own verification. Thus, the control centre may receive a single verification, which indicates that the first module and the second module have verified the electrical connection.

According to an example, the step of activating communication means in the first module comprises activating an internal communication network in the first module. The communication means in the first module is communication means for communicating with another module. Thus, the communication means may comprise an internal communication network. The internal communication network may be CAN J1939, Flexray, Ethernet, fiber or similar. The first module and the second module are suitably electrically connected via corresponding electrical interfaces. The communication means may be comprised in the electrical interface. Such an electrical interface may be configured to transfer electric energy and/or to transmit and/or receive electric signals. The electrical interface may be a wireless interface and/or a conductive interface. By connecting the first module and the second module electrically, the modules may thus be able to transfer electric energy between each other and also share information. The communication means may comprise a transmitter and/or a receiver for wireless communication. The communication means may be activated by means of controlling a switch, a contactor or similar. In addition to the communication means for communicating with another module, the first module may also comprise wireless communication means for communicating with the control centre. The communication means for communicating with the control centre may always be activated.

The activation of the communication means may be performed in response to any one of: receiving an instruction for the activation from the control centre, or detecting that the physical connection has been established. Thus, the method may comprise receiving an instruction for the activation of communication means from the control centre, or it may comprise detecting that a physical connection between the first module and the second module has been established. Typically, a vehicle operator, such as a fleet manager or vehicle owner, has a list of requested functions/missions to be performed. Such functions/missions could be transporting persons, goods, garbage or similar. In order to perform a certain function/mission, the operator requires a specific vehicle and the operator typically plans which vehicle to use, when, and for which mission. According to an example of the present disclosure, the control centre receives information about at least one requested function/ mission to be performed. In one example the control centre receives the information about the at least one function/mission to be performed from an operator via a user interface, such as a touch screen, keyboard or similar. In another example the information regarding the function/mission is automatically obtained by the control centre by means of for example Artificial Intelligence, based on requested functions/missions to be performed. When the control centre has information about a function/mission to be performed, the control centre may determine what type of vehicle is required to perform said function/mission. The control centre may select modules to form the vehicle, also referred to as the assembled vehicle, based on a function to be performed by the assembled vehicle. The control centre then transmits signals to the modules, which together will form the assembled vehicle, with the command of connecting physically with each other. The control centre may also transmit instructions to the modules to connect electrically with each other. Based on this instruction the control device of the first module may activate the communication means in the first module. Alternatively, the control device of the first module detects that the first module has been physically connected with the second module and thereafter activates the communication means to connect electrically with the second module. The first module may detect the physical connection by means of signals from a sensor device. The sensor device may be arranged at the first module and/or at the second module. The sensor device may be configured to sense when the first module and the second module have been correctly connected physically. The control device of the first module may be arranged in communication with the sensor device and may thereby receive a signal from the sensor device indicating that the physical connection was successfully performed.

According to an example, the step of transmitting information about the first module to the second module also comprises transmitting the information to the control centre. This way, the control centre receives information about the first module which may be useful for the operation of the vehicle.

The transmitted information about the first module, and the received information about the second module, may comprise one or more of: the state of charge of an energy storage unit, maximum speed, weight, brake capacity, and/or maximum steering angle, just to mention some non-limiting examples. Thus, the first module may transmit information about the state of charge (SOC) of an energy storage unit of the first module. This information may be transmitted to the second module as well as to the control centre. The state of charge of the energy storage unit of the first module may be crucial to know when operating the vehicle. If the state of charge is low, the control centre may command the assembled vehicle to charge the energy storage unit of the first module. Also, during operation of the vehicle, the state of charge of the different modules is of importance. The maximum speed, weight, brake capacity, and maximum steering angle of the module may also be useful for the control centre and the other modules of the vehicle to know. The weight of a functional module may be important for a drive module to know, in order to control the braking and also to control the suspension of the drive module.

According to an example, the method further comprises receiving information from the control centre, the information indicating which module of the vehicle to operate as a master and which module(s) to operate as slave(s). In the event that the vehicle comprises two or more drive modules, it is convenient to appoint one drive module to operate as a master and the rest of the drive modules and the functional module to operate as slaves. The master will decide how to operate the drive modules and thus how to operate the assembled vehicle. It is thus important that all modules can communicate with each other in order for the master to be able to operate the vehicle in an optimal way. The control device of the first module according to the present disclosure may thus receive instructions from the control centre to operate the first module as a master or to operate the first module as a slave. The control centre may appoint a certain drive module to operate as a master for example based on the state of charge of the energy storage unit and/or the main travel direction of the assembled vehicle. According to another example, the assembled vehicle itself determines which module of the vehicle to operate as a master and which module(s) to operate as slave(s). Since the first module and the second module have exchanged information, the control device of the first module may be able to determine which module to operate as a master and which module(s) to operate as slave(s), for example based on the state of charge of the energy storage units of the connected modules and/or the main travel direction of the assembled vehicle.

According to an example, the method further comprises receiving a unique vehicle identity from the control centre. The control centre may generate a unique identity for the assembled vehicle and transmit the unique vehicle identity to all modules of the assembled vehicle. The unique vehicle identity may be a number, a combination of letters and/or numbers, or a specific word. When the different modules are physically and electrically connected, a vehicle has been assembled and a unique vehicle identity is generated. No matter if a module is exchanged due to malfunction, the unique vehicle identity remains the same for the vehicle comprising the remaining non-exchanged module(s) and also a new replacement module. The unique vehicle identity thus remains the same until the vehicle is disassembled. The unique vehicle identity may be used in the communication between the control centre and the first module.

According to an example, the method further comprises transmitting a verification to the control centre that the unique vehicle identity has been received. By verifying the receipt of the unique vehicle identity, a second verification that the assembled vehicle is ready for operation is achieved. By verifying that the unique vehicle identity has been received by the first module, the control centre is informed that the assembled vehicle is ready to perform a mission/function.

When the first module and the second module are electrically connected, the control centre may command the assembled vehicle to perform a mission/function. The mission/function may be communicated to the control device of the first module, which automatically controls the assembled vehicle to perform the function/mission in the event that the first module is a master drive module.

The present disclosure also relates to a control device of a first module of a vehicle, the control device being configured for electrically connecting the first module with a second module physically connected with the first module, the vehicle being assembled from a set of modules comprising: at least one drive module; and at least one functional module, wherein the at least one drive module comprises a pair of wheels and is configured to be autonomously operated and drive the assembled vehicle, and wherein the assembled vehicle is configured to communicate with a control centre, the control device being configured to: activate communication means in the first module; transmit information about the first module to the second module, and receive information about the second module, via the communication means, for establishing an electrical connection; and transmit a verification of the electrical connection towards the control centre.

It will be appreciated that all the embodiments described for the method aspect of the invention performed by the control device are also applicable to the control device aspect of the invention. That is, the control device may be configured to perform any one of the steps of the method according to the various embodiments described above.

The first module comprises the control device and the control device may be configured to control the operation of the first module. In the event that the first module is a drive module, the control device may thus be configured to transmit control signals to the various systems and components of the first module for controlling for example the steering and the propulsion of the first module. The control device may thereby be adapted to operate the first module autonomously based on received commands, e.g. from the control centre, and based on sensor input regarding its surroundings and positioning. The control device is in that case adapted to receive commands from a remotely located control centre and to convert the command into control signals for controlling the various systems and components of the first module. The control device may be configured to receive data about the surroundings from various sensor devices, and based on this data control the first module. The control device may also be adapted to communicate with traffic systems of various kinds. The control device may thereby be able to determine the status of a traffic light, determine if an accident has occurred and based on that determine a new route for the vehicle, or itself if not connected to a functional module, etc. The control device may be adapted to communicate directly with such traffic systems or it may be adapted to communicate with such traffic systems via the control centre. The control device may be implemented as a separate entity or distributed in two or more physical entities. The control device may comprise one or more computers. The control device may thus be implemented or realized by the control device comprising a processor and a memory, the memory comprising instructions, which when executed by the processor causes the control device to perform the herein disclosed method steps.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above.

According to an aspect of the present disclosure, a vehicle assembled from a set of modules is provided. The vehicle comprises at least one drive module and at least one functional module, wherein the at least one drive module comprises a pair of wheels and is configured to be autonomously operated and drive the assembled vehicle. The vehicle comprises two physically connected modules. The vehicle further comprises two control devices as disclosed herein. Thus, the two physically connected modules both comprise a control device as disclosed herein.

Furthermore, the present disclosure relates to a system configured for electrically connecting two physically connected modules of a vehicle assembled from a set of module. The system comprises a control centre arranged in communication with the assembled vehicle and two control devices as disclosed herein. Each control device is comprised in one of the physically connected modules, wherein each control device corresponds to the control device of the first module. Thus, each control device of the system is configured to: activate communication means in the first module; transmit information about the first module to the second module and receive information about the second module, via the communication means, for establishing an electrical connection; and transmit a verification of the electrical connection towards the control centre. As an illustrative and non-limiting example, assume that the assembled vehicle comprises one drive module and one functional module. For the drive module's point of view, it is the first module and the functional module is the second module. For the functional module's point of view, it is the first module and the drive module is the second module. Thus, the control device described above and the method performed thereby is applicable to all control devices of the assembled vehicle. Analogously, in another illustrative and non-limiting example, assume that the assembled vehicle comprises two drive modules (DM1 and DM2) and one functional module. For the functional module's point of view, it is the first module and the other two modules, DM1 and DM2, are both second modules. For the DM1's and DM2's point of view, they are each the first module and the functional module is the second module.

The control centre may be referred to as an off-board system. The control centre may be geographically at a distance from the first and second module. The control centre may be adapted to receive information about missions or functions to be performed; and based on this mission/function, initiate assembly of a vehicle. The control centre may be adapted to receive this information from an operator via a user interface. The control centre may be implemented as a separate entity or distributed in two or more physical entities. The control centre may comprise one or more computers.

The present disclosure will now be further illustrated with reference to the appended figures.

The term "link" refers herein to a communication link which may be a physical connection such as an opto-electronic communication line, or a non-physical connection such as a wireless connection, e.g. a radio link or microwave link.

FIG. 1 schematically illustrates a control device 100 of a first module of a vehicle according to an embodiment. The control device 100 is configured for electrically connecting the first module with a second module physically connected with the first module. The control device 100 is thus configured to electrically connect two physically connected modules of a vehicle. The vehicle is assembled from a set of modules comprising: at least one drive module; and at least one functional module. The first module may be a drive module or a functional module. If the first module is a drive module the second module may be a second drive module or a functional module. If the first module is a functional module, the second module is suitably a drive module. The vehicle, the set of modules, the at least one drive module, the at least one functional modules and thus the first module and the second module are disclosed in FIG. 3. The control device 100 is comprised in the first module. Thus, irrespective of whether the first module is a drive module or a functional module it comprises the control device 100 according to the present disclosure. The control device 100 of the first module is configured to communicate with a control centre 200 either directly or indirectly via the second module. The control device 100 is configured to: activate communication means in the first module; transmit information about the first module to the second module and receive information about the second module via the communication means, for establishing an electrical connection; and transmit a verification of the electrical connection towards the control centre 200. The control device 100 is configured to control the communication means of the first module.

The control device 100 may be configured to transmit the verification towards the control centre 200 via the second module electrically connected to the first module.

Figure 2:
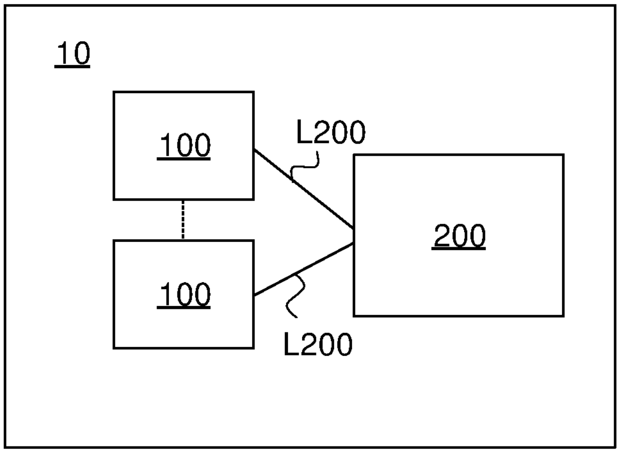
FIG. 2 schematically illustrates a system for electrically connecting two modules of a vehicle according to embodiments.

According to one example, the control device 100 is configured to activate the communication means in response to any one of: receiving an instruction for the activation from the control centre 200, or detecting that the physical connection has been established. The control device 100 may be arranged in communication with a sensor device 60 arranged on the first module and/or on the second module. In FIG. 2, the control device 100 is arranged to communicate with the sensor device 60 via a link L60. The control device 100 may thus be configured to receive a signal from the sensor device 60 indicating that the physical connection has been correctly performed, and based on this activate the communication means in the first module.

The control device 100 is, according to an example, configured to transmit the information about the first module to the control centre 200.

The transmitted information about the first module may comprise one or more of: the state of charge of an energy storage unit of the first module, maximum speed, weight, brake capacity, and/or maximum steering angle of the first module. The received information about the second module may comprise one or more of: the state of charge of an energy storage unit of the second module, maximum speed, weight, brake capacity, and/or maximum steering angle of the second module.

The control device 100 may further be configured to receive information from the control centre 200, the information indicating which module of the vehicle 1 to operate as a master and which module(s) to operate as slave(s). The control device 100 may thus be configured to receive instructions to operate the first module as a master or to operate the first module as a slave. In the case where the first module is appointed to operate as a master, the control device 100 may also be configured to instruct the second module to operate as a slave.

According to an example, the control device 100 is also configured to receive a unique vehicle identity from the control centre 200. This way, the control device 100 and thus the first module is associated with the unique vehicle identity of the assembled vehicle 1. The unique vehicle identity may be a number, a combination of letters and/or numbers, or a specific word. The unique vehicle identity may be used in the communication between the control centre 200 and the first module. The control device 100 may also be configured to verify that the first module has received the unique vehicle identity. This way, the control device 100 informs the control centre 200 that the first module is ready to operate.

FIG. 2 schematically illustrates a system 10 configured for electrically connecting two physically connected modules of a vehicle according to an embodiment. The system 10 comprises a control centre 200 and two control devices 100. The system 10 may comprise more than two control devices 100. The control devices 100 are each configured as the control device 100 as disclosed in FIG. 1. Each control device 100 is comprised in one of the two physically connected modules. Each control device 100 of the system 10 is configured to: activate communication means in the module in which it is comprised; transmit information about the module to the other module and receive information about the other module, via the communication means, for establishing an electrical connection; and transmit a verification of the electrical connection towards the control centre.

The control devices 100 are arranged in communication with the control centre 200 via a respective link L200. The control centre 200 may be referred to as an off-board system. The control centre 200 may be implemented as a separate entity or distributed in two or more physical entities. The control centre 200 may comprise one or more computers.

Figure 3:
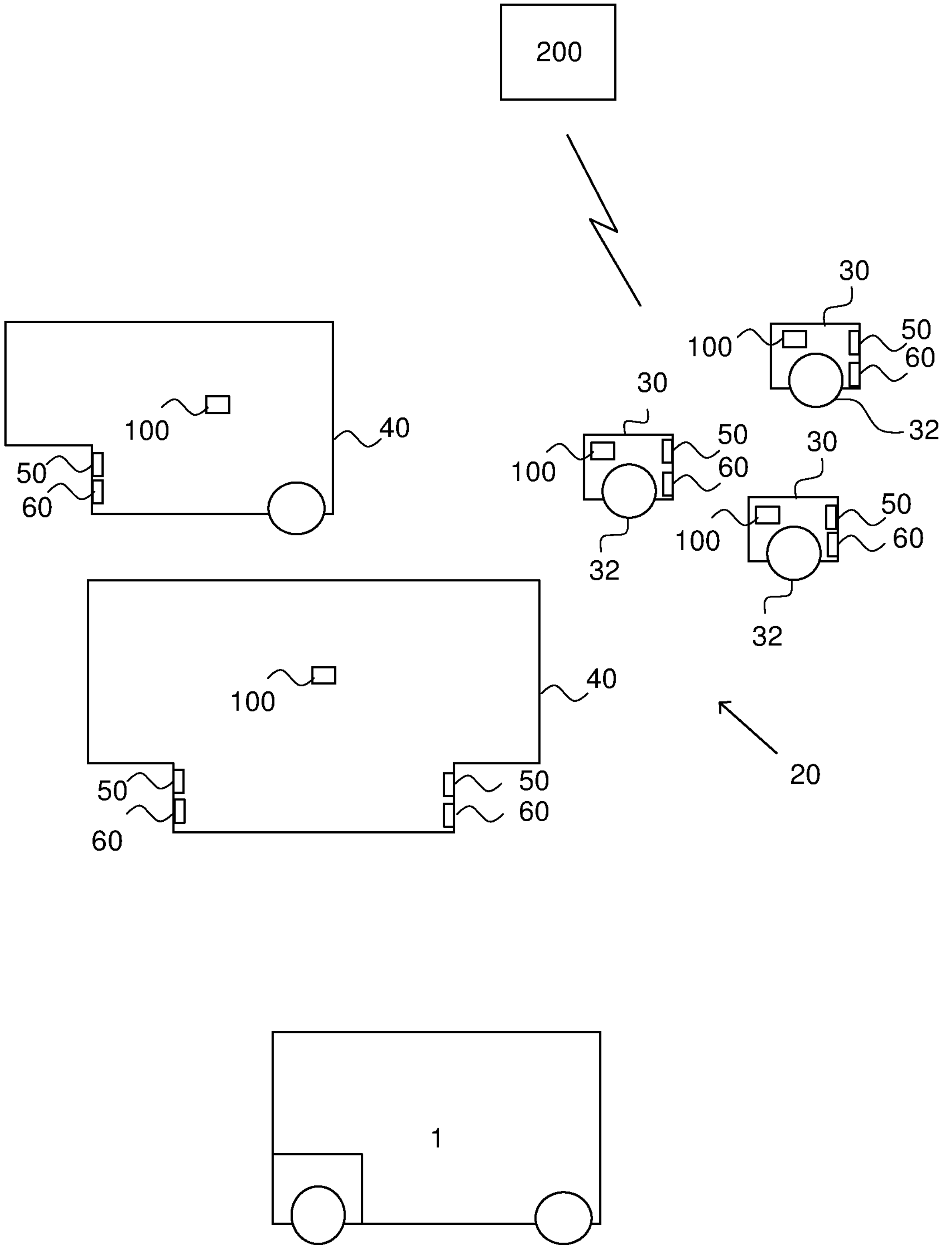
FIG. 3 schematically illustrates application of a system for electrically connecting two modules of a vehicle according to an embodiment.

FIG. 3 schematically shows an example of an application of a system 10 as disclosed in FIG. 2. Thus, FIG. 3 illustrates a context in which the system 10 may be used. The figure illustrates a set of modules 20 for assembling a vehicle 1. An assembled vehicle 1 is also illustrated. The set of modules 20 comprises a plurality of drive modules 30 and a plurality of functional modules 40, wherein each drive module 30 comprises a pair of wheels 32 and is configured to be autonomously operated. Each module 30, 40 in the set of modules 20 comprise at least one interface releasably connectable to a corresponding interface on another module 30, 40. The modules 30, 40 suitably comprise at least one physical interface and at least one electrical interface. By combining drive modules 30 and functional modules 40, different types of vehicles 1 can be achieved. Some vehicles 1 require two drive modules 30 and some vehicles 1 only require one drive module 30, depending on the structural configuration of the functional module 40. Each module 30, 40 comprises a control device 100 as disclosed in FIG. 1 and can thus communicate with a control centre 200 as disclosed in FIG. 2. Each drive module 30 may comprise a plurality of interfaces for releasable connection with other modules 30, 40. The interface(s) of the drive modules 30 may be arranged on different sides of the drive module 30 and thus enable connection with other modules 30, 40 on multiple sides of the drive module 30. The interfaces on the drive modules 30 and the functional modules 40 respectively, are suitably arranged on corresponding positions to enable connection between the modules 30, 40. Each module 30, 40 comprise communication means 50 for communication with another module 30, 40. The communication means 50 may form part of the at least one interface of each module 30, 40. The communication means 50 of each module 30, 40 are controlled by the control devices 100 of the module 30, 40. The communication means 50 may comprise an internal communication network, such as CAN J1939, Flexray, Ethernet, fiber or similar. The communication means 50 may additionally or alternatively comprise a transmitter and a receiver for wireless communication between the modules 30, 40. The communication means 50 may be activated by means of controlling a switch, a contactor or similar.

An example of a sequence for vehicle assembly will be described below. An operator may receive a mission from a client to transport goods from one location to another. Information about the mission is obtained in the control centre 200, for example from the operator via a user interface, such as a touch screen or similar. It is pointed out that this is merely an example, and the received mission may automatically be translated and/or inputted to the control centre 200. The control centre 200 then determines which function to be performed and thus which type of vehicle 1 is required to complete the mission. In this example, the required vehicle 1 may be a truck. The control centre 200 also selects which modules 30, 40 to use for the required truck. The type of vehicle 1 and the modules 30, 40 required to complete the mission may for example be selected based on information about the goods, the distance to travel and/or the geographical location. The control centre 200 then suitably converts the mission into a command for, in this case, one selected drive module 30 to physically connect with the selected functional module 40. The control device 100 of the drive module 30 receives the command and converts the command to control signals for the drive module 30. The drive module 30 is thereby controlled to physically connect with the functional module 40. The drive module 30 is thus autonomously operated to find the selected functional module 40 and connect with that functional module 40. At least one sensor device 60 arranged at the drive module 30 and/or the functional module 40 may be configured to sense when the physical connection has been performed. The at least one sensor device 60 may send a signal to the control devices 100 indicating that the connection has been performed. When the two modules 30, 40 are physically connected they should be electrically connected. The control device 100 of the drive module 30 and the control device 100 of the functional module 40 are each activating the communication means 50 in the respective module 30, 40 to enable communication with the other module 30, 40. The control devices 100 subsequently transmit information about the respective module 30, 40 to the other module 30, 40 and receive information about the other module 30, 40, whereby an electrical connection is established between the modules 30, 40. Subsequently, the control devices 100 transmit a verification of the electrical connection towards the control centre 200. According to an example each control device 100 transmits a verification directly to the control centre 200. Alternatively, the control device 100 of the functional module 40 transmits a verification of the electrical connection to the control device 100 of the drive module 30, whereby the control device 100 of the drive module 30 transmit a verification of the electrical connection to the control centre 200 indicating that both the functional module 40 and the drive module 30 verifies the electrical connection. The control centre 200 may then generate a unique vehicle identity for the assembled vehicle 1 which is transmitted to the modules 30, 40. A vehicle 1 is thus assembled and the vehicle 1 is ready to perform the mission.

Figure 4A:
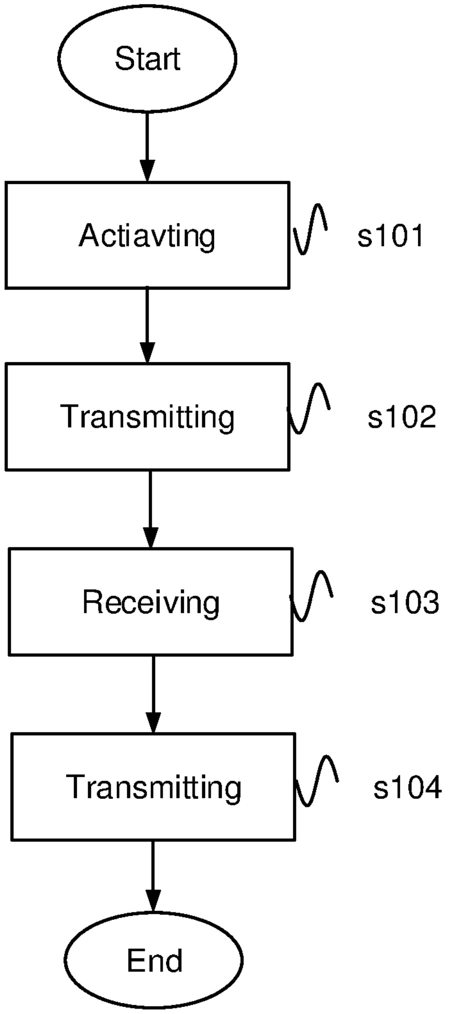
FIG. 4*a-b* illustrates flow charts for a method, performed by a control device, for electrically connecting two modules of a vehicle according to an embodiment.

FIG. 4*a* illustrates a flow chart for a method, performed by a control device 100 of a first module of a vehicle, for electrically connecting the first module with a second module physically connected with the first module, according to an embodiment. The vehicle is assembled from a set of modules. The method thus relates to the control device 100 as disclosed in FIG. 1, the system 10 as disclosed in FIG. 2 and the set of modules 20 as disclosed in FIG. 3. The set of modules 20 thus comprises at least one drive module 30 and at least one functional module 40. The method comprises: activating s101 communication means 50 in the first module 30, 40; transmitting s102 information about the first module 30, 40 to the second module 30, 40, and receiving s103 information about the second module 30, 40, via the communication means 50 for establishing an electrical connection; and transmitting s104 a verification of the electrical connection towards the control centre 200. By transmitting s102 information about the first module 30, 40 to the second module 30, 40 and receiving s103 information about the second module 30, 40, the two physically connected modules 30, 40 will exchange information which may be necessary for the operation of the assembled vehicle 1. Also, via the exchange of information, the first module 30, 40 may be able to determine whether the second module 30, 40 is a correct module to be electrically connected with. The verification informs the control centre 200 that correct modules are electrically connected in a correct way and that the vehicle 1 thereby is ready to receive instructions regarding a function/mission to perform.

The first module 30, 40 may be a drive module 30 or a functional module 40 and the second module 30, 40 may be a drive module 30 or a functional module 40.

The verification of the electrical connection may be transmitted s104 from the first module 30, 40 directly to the control centre 200. Alternatively, the verification may be transmitted s104 towards the control centre 200 via the second module 30, 40 electrically connected with the first module 30, 40.

Activating s101 communication means 50 in the first module 30, 40 may comprise activating s101 an internal communication network in the first module 30, 40. Additionally or alternatively, activating s101 communication means 50 in the first module 30, 40 may comprise activating s101 a transmitter and a receiver for wireless communication. The communication means 50 may be activated by means of controlling a switch, a contactor or similar.

The transmitted information about the first module 30, 40, and the received information about the second module 30, 40, may comprise one or more of: the state of charge of an energy storage unit, maximum speed, weight, brake capacity, and/or maximum steering angle. Thus, the first module 30, 40 may transmit information about the state of charge of an energy storage unit of the first module 30, 40, the maximum speed, weight, brake capacity, or maximum steering angle of the first module 30, 40.

The step of transmitting s102 information about the first module 30, 40 to the second module 30, 40 may also comprise transmitting s102 the information to the control centre 200.

Figure 4B:
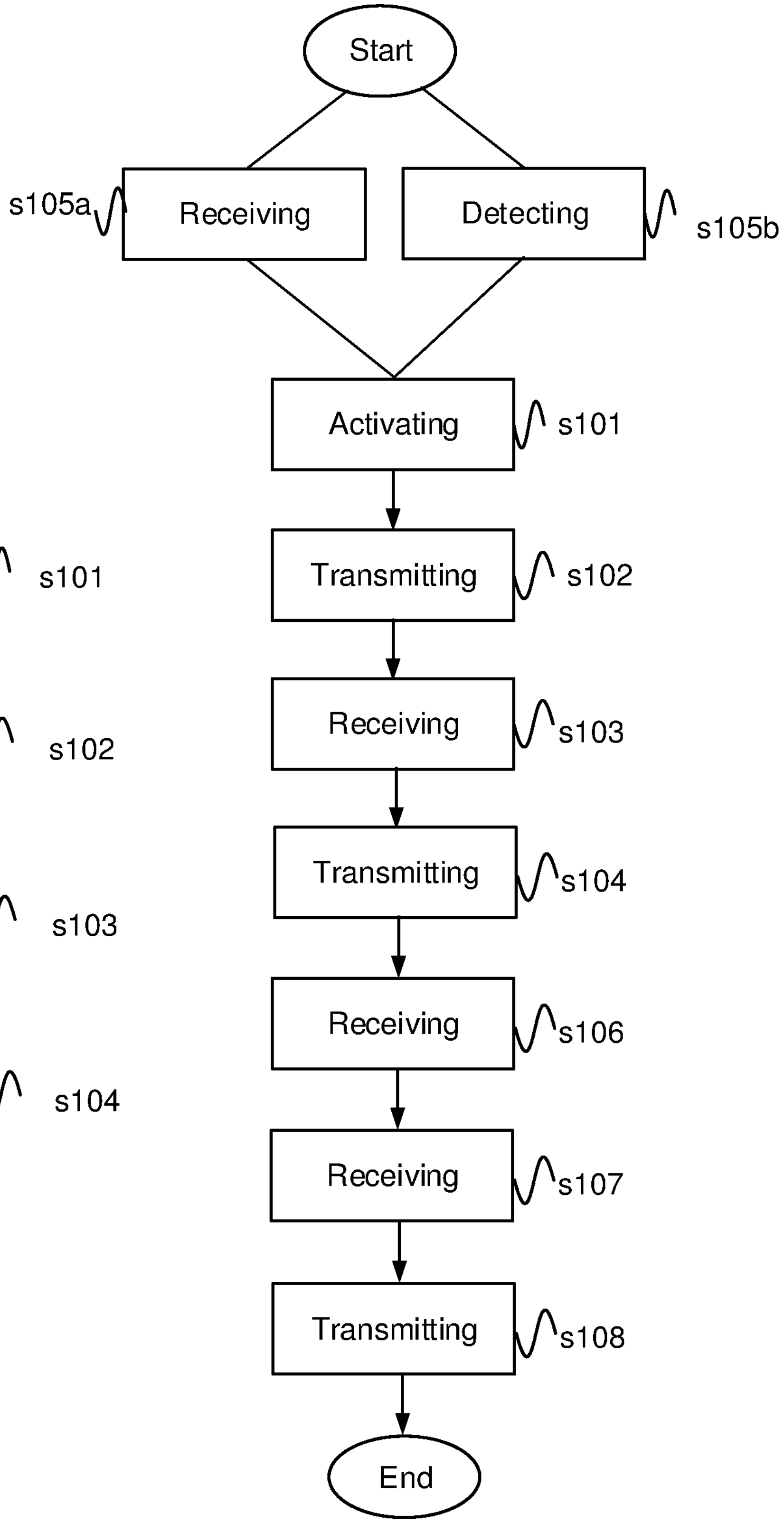

FIG. 4*b* illustrates a flow chart for a method, performed by a control device 100 of a first module of a vehicle, for electrically connecting the first module with a second module physically connected with the first module according to an embodiment. The vehicle is assembled from a set of modules. The method thus relates to the control device 100 as disclosed in FIG. 1, the system 10 as disclosed in FIG. 2, and the set of modules 20 as disclosed in FIG. 3. The set of modules 20 thus comprises at least one drive module 30 and at least one functional module 40. The first module 30, 40 may be a drive module 30 or a functional module 40 and the second module 30, 40 may be a drive module 30 or a functional module 40.

The method comprises receiving s105*a* an instruction for activation of communication means 50 from the control centre 200 or alternatively detecting s105*b* that the physical connection between the modules 30, 40 has been established. As a response to either of the two alternatives, the control device 100 activates s101 communication means 50 in the first module 30, 40. The control centre 200 typically selects modules 30, 40 to form the assembled vehicle 1 and transmits signals to the modules 30, 40 with the command of connecting physically with each other. The control centre 200 may also transmit instructions to the modules 30, 40 to connect electrically with each other. Alternatively, the control device 100 of the first module 30, 40 detects s105*b* that the first module 30, 40 has been physically connected with the second module 30, 40 and thereafter activates s101 the communication means 50 to connect electrically with the second module 30, 40. The first module 30, 40 may detect the physical connection by means of signals from the sensor device 60 as disclosed in FIG. 1.

Activating s101 communication means 50 in the first module 30, 40 may comprise activating s101 an internal communication network in the first module 30, 40. Additionally or alternatively, activating s101 communication means 50 in the first module 30, 40 may comprise activating s101 a transmitter and a receiver for wireless communication. The communication means 50 may be activated by means of controlling a switch, a contactor or similar.

The method further comprises transmitting s102 information about the first module 30, 40 to the second module 30, 40, and receiving s103 information about the second module 30, 40, via the communication means 50 for establishing an electrical connection. The transmitted information about the first module 30, 40, and the received information about the second module 30, 40, may comprise one or more of: the state of charge of an energy storage unit, maximum speed, weight, brake capacity, and/or maximum steering angle. Thus, the first module 30, 40 may transmit s102 information about the state of charge of an energy storage unit of the first module 30, 40, the maximum speed, weight, brake capacity, or maximum steering angle of the first module 30, 40. According to an example, the step of transmitting s102 information about the first module 30, 40 to the second module 30, 40 also comprises transmitting s102 the information to the control centre 200.

The method further comprises transmitting s104 a verification of the electrical connection towards the control centre 200. The verification of the electrical connection may be transmitted s104 from the first module 30, 40 directly to the control centre 200. Alternatively, the verification may be transmitted s104 towards the control centre 200 via the second module 30, 40 electrically connected with the first module 30, 40.

According to this example, the method further comprises receiving s106 information from the control centre 200, the information indicating which module 30, 40 of the vehicle 1 to operate as a master and which module(s) 30, 40 to operate as slave(s). The master will decide how to operate the modules 30, 40 and thus how to operate the assembled vehicle 1. The control device 100 of the first module 30, 40 may receive instructions from the control centre 200 to operate the first module 30, 40 as a master or to operate the first module 30, 40 as a slave.

The method further comprises receiving s107 a unique vehicle identity from the control centre 200. The control centre 200 may generate a unique identity for the assembled vehicle 1 and transmit the unique vehicle identity to all modules 30, 40 of the assembled vehicle 1. The unique vehicle identity may be a number, a combination of letters and/or numbers, or a specific word. The unique vehicle identity may be used in the communication between the control centre 200 and the first module 30, 40.

The method further comprises transmitting s108 a verification to the control centre 200 that the unique vehicle identity has been received. By verifying the receipt of the unique vehicle identity, a second verification that the assembled vehicle 1 is ready for operation is achieved. Thus, after the second verification the assembly of the vehicle 1 may be considered completed and the assembled vehicle 1 may receive a mission or function to be performed.

Figure 5:
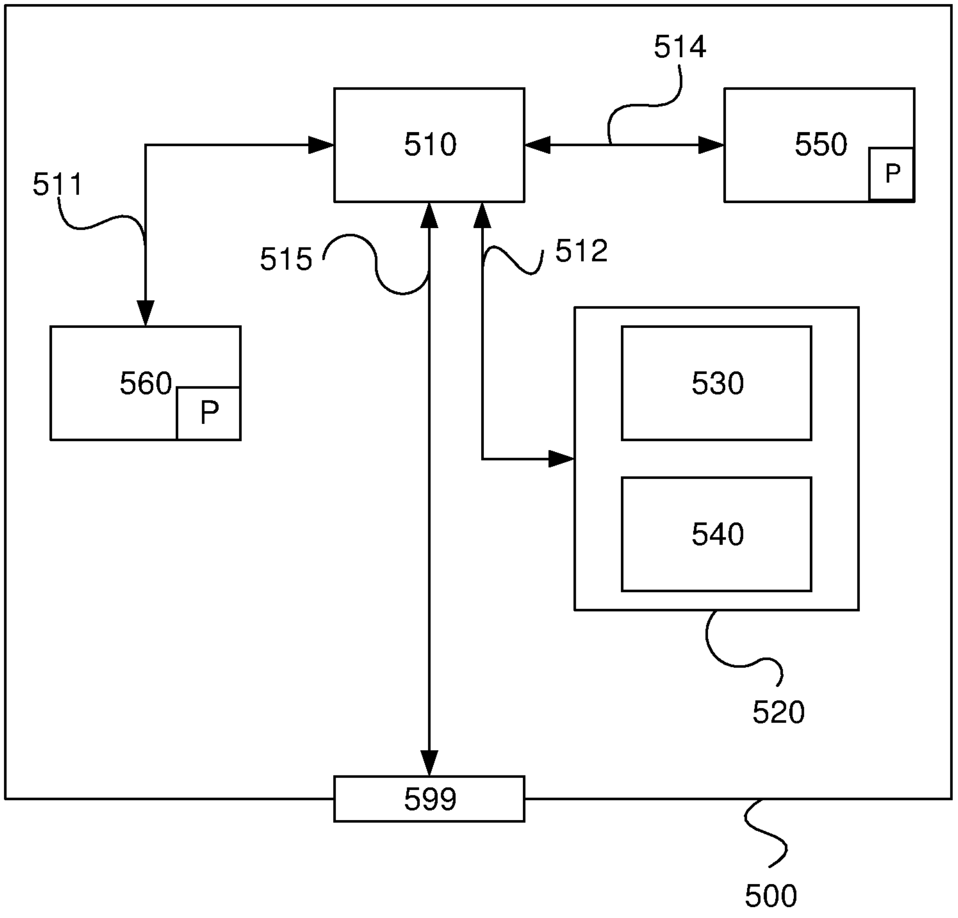
FIG. 5 schematically illustrates a control device or computer according to an embodiment.

FIG. 5 is a diagram of a version of a device 500. The control device 100 described with reference to FIG. 1 and FIG. 2 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P which comprises routines for electrically connecting two physically connected modules of a vehicle. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device of a first module of a vehicle, for electrically connecting the first module with a second module physically connected with the first module, wherein the vehicle is assembled from a set of modules comprising:

at least one drive module, and at least one functional module;

wherein the at least one drive module comprises a pair of wheels and the drive module is configured to be autonomously operated and drive the vehicle, and wherein the vehicle is configured for communicating with a control centre, the method comprising:

activating, based on detecting that the first module is physically connected to the second module, communication means in the first module for communicating with the second module;

transmitting, via the communication means, information about the first module to the second module physically connected with the first module;

receiving, via the communication means, information about the second module for establishing an electrical connection with the second module;

transmitting, to the control centre and based on receiving the information about the second module, an indication that the first module is successfully electrically connected to the second module; and determining which module of the vehicle is to operate as a master, controlling operation of the vehicle, and which module of the vehicle is to operate as a slave, wherein the determining comprises:

determining, by the control device, states of charge of energy storage units of the first module and the second module, and selecting, by the control device and based on the states of charge of the energy storage units, one of the first module or the second module as the master.

2. The method according to claim 1, further comprising transmitting the indication to the control centre via the second module electrically connected to the first module.

3. The method according to claim 1, wherein the activating the communication means comprises activating an internal communication network in the first module for communicating between different modules.

4. The method according to claim 1, further comprising activating the communication means further in response to receiving an instruction for the activation from the control centre.

5. The method according to claim 1, wherein transmitting information about the first module to the second module also comprises transmitting the information to the control centre.

6. The method according to claim 1, wherein the transmitted information about the first module, and the received information about the second module, comprises one or more of: a state of charge of an energy storage unit, a maximum speed, a weight, a brake capacity, and/or a maximum steering angle.

7. The method according to claim 1, further comprising:

receiving a unique vehicle identity from the control centre.

8. The method according to claim 7, further comprising:

transmitting a verification to the control centre that the unique vehicle identity has been received.

9. A non-transitory computer-readable medium comprising instructions, which when executed by a computer, cause the computer to:

activate, based on detecting that a first module of a vehicle is physically connected to a second module of the vehicle, communication means in the first module for communicating with the second module;

transmit, via the communication means, information about the first module to the second module;

receive, via the communication means, information about the second module for establishing an electrical connection with the second module;

transmit, to a control centre and based on receiving the information about the second module, an indication that the first module is successfully electrically connected to the second module; and determine which module of the vehicle is to operate as a master, controlling operation of the vehicle, and which module of the vehicle is to operate as a slave, wherein the instructions, when executed by the computer, cause the determining by causing:

determining states of charge of energy storage units of the first module and the second module, and selecting, based on the states of charge of the energy storage units, one of the first module or the second module as the master.

10. A control device of a first module of a vehicle, wherein the control device is configured for electrically connecting the first module to a second module that is physically connected with the first module, wherein the vehicle is assembled from a set of modules comprising:

at least one drive module, and at least one functional module;

wherein the at least one drive module comprises a pair of wheels and is configured to be autonomously operated and to drive the vehicle, and wherein the vehicle is configured to communicate with a control centre;

the control device being configured to:

activate, based on detecting that the first module is physically connected to the second module, communication means in the first module for communicating with the second module;

transmit, via the communication means, information about the first module to the second module physically connected with the first module;

receive, via the communication means, information about the second module for establishing an electrical connection between the first module and the second module;

transmit, to the control centre and based on receiving the information about the second module, an indication that the first module is successfully electrically connected to the second module; and determine which module of the vehicle is to operate as a master, controlling operation of the vehicle, and which module of the vehicle is to operate as a slave, wherein the determining comprises:

determining, by the control device, states of charge of energy storage units of the first module and the second module, and selecting, by the control device and based on the states of charge of the energy storage units, one of the first module or the second module as the master.

11. The control device according to claim 10, wherein the control device is configured to transmit the indication to the control centre via the second module connected to the first module.

12. The control device according to claim 10, wherein the control device is configured to activate the communication means further in response to receiving an instruction for the activation from the control centre.

13. The control device according to claim 10, wherein the control device is configured to transmit the information about the first module to the control centre.

14. The control device according to claim 10, wherein the transmitted information about the first module and the received information about the second module, comprises one or more of: a state of charge of an energy storage unit, maximum speed, weight, brake capacity, and/or maximum steering angle.

15. The control device according to claim 10, wherein the control device is configured to receive a unique vehicle identity from the control centre.

16. The control device according to claim 15, wherein the control device is configured to verify that the first module has received the unique vehicle identity.

17. A vehicle assembled from a set of modules, the vehicle comprising at least one drive module and at least one functional module, wherein the at least one drive module comprises a pair of wheels and is configured to be autonomously operated and drive the vehicle, and the vehicle further comprising two control devices, wherein each control device is configured to:

based on detecting that a first module associated with the control device is physically connected to a second module, activate communication means in the first module for communicating with the second module;

transmit, via the communication means, information about the first module to the second module;

receive, via the communication means, information about the second module for establishing an electrical connection with the second module;

transmit, to a control centre and based on receiving the information about the second module, an indication that the first module is successfully electrically connected to the second module; and determine which module of the vehicle is to operate as a master, controlling operation of the vehicle, and which module of the vehicle is to operate as a slave, wherein the determining comprises:

determining, by the control device, states of charge of energy storage units of the first module and the second module, and selecting, by the control device and based on the states of charge of the energy storage units, one of the first module or the second module as the master.

18. A system, configured to electrically connect two physically connected modules of a vehicle assembled from a set of modules, the system comprising:

a control centre arranged in communication with the vehicle, wherein the system further comprises two control devices, wherein each control device is configured to:

based on detecting that a first module associated with the control device is physically connected to a second module, activate communication means in the first module for communicating with the second module;

transmit, via the communication means, information about the first module to the second module;

receive, via the communication means, information about the second module for establishing an electrical connection with the second module;

transmit, to the control centre and based on receiving the information about the second module, an indication that the first module is successfully electrically connected to the second module; and determine which module of the vehicle is to operate as a master, controlling operation of the vehicle, and which module of the vehicle is to operate as a slave, wherein the determining comprises:

determining, by the control device, states of charge of energy storage units of the first module and the second module, and selecting, by the control device and based on the states of charge of the energy storage units, one of the first module or the second module as the master.

19. The method according to claim 1, wherein:

the detecting that the first module is physically connected to the second module is based on receiving, from a sensor device, an indication of physical connection between the first module and the second module; and the activating the communication means in the first module is based on the receiving the indication of physical connection between the first module and the second module.

* * * * *